Dec. 7, 1965  R. E. CLARKE  3,222,078
COMBINATION WAGON

Filed Jan. 15, 1964  2 Sheets-Sheet 1

INVENTOR
Robert E. Clarke
BY *Thomas W. J. Clark*
ATTORNEY

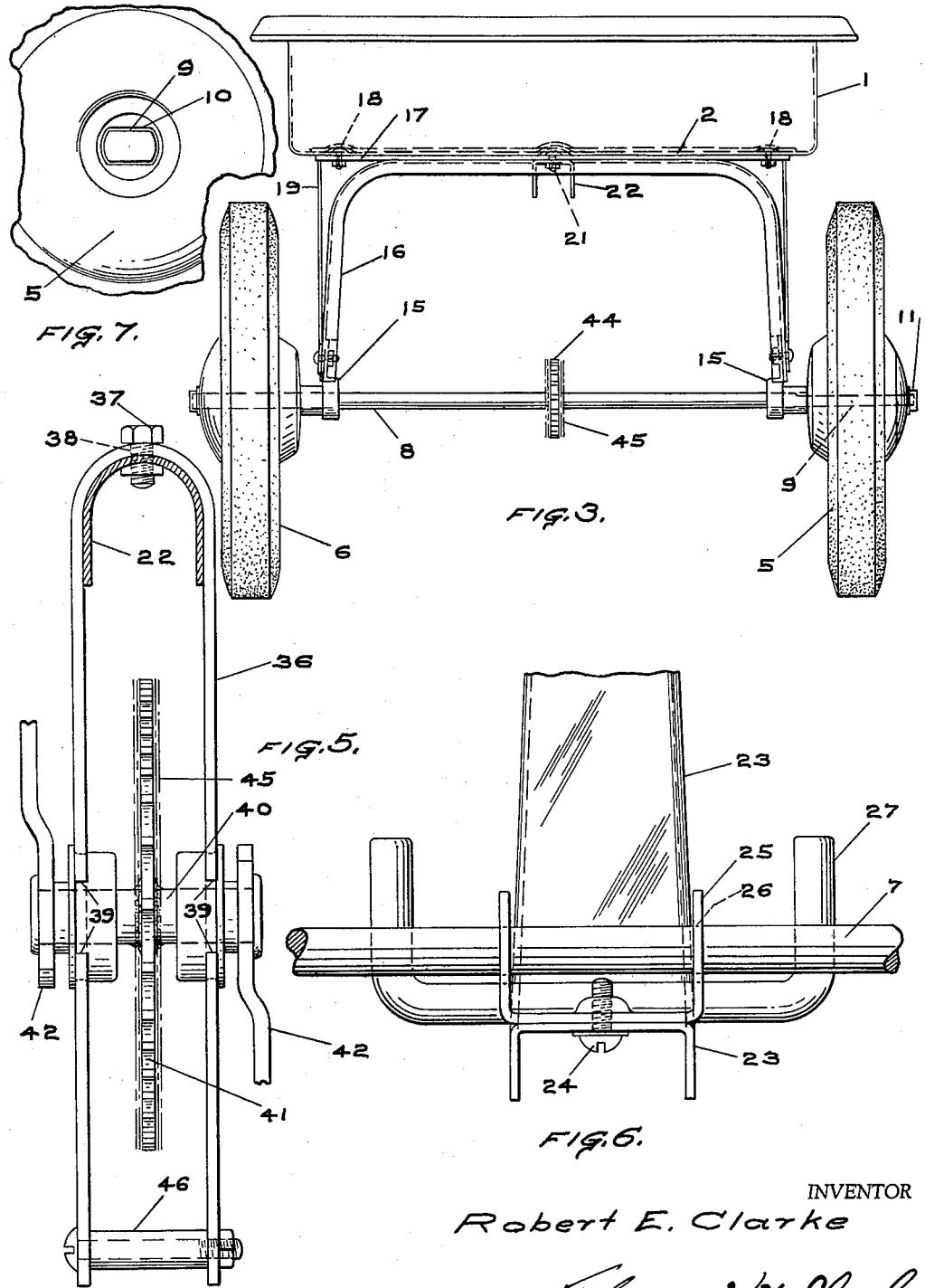

United States Patent Office 3,222,078
Patented Dec. 7, 1965

3,222,078
COMBINATION WAGON
Robert E. Clarke, 1410 Saratoga Drive, Bel Air, Md.
Filed Jan. 15, 1964, Ser. No. 337,818
4 Claims. (Cl. 280—7.17)

This invention relates to a combination open bodied or express wagon and a pedal wagon and its objects are to produce such a wagon as will be particularly rugged and economical to make as well as giving great satisfaction to the user. It may be converted quickly from the express type of wagon to the pedal form of wagon by simply lifting a door in the floor of the wagon body.

Other objects and advantages of the wagon will be apparent from the following description and accompanying drawings forming a part hereof and in which:

FIGURE 3 is a rear elevational view thereof.

FIGURE 5 is a vertical sectional view on line 5—5 of FIGURE 1.

FIGURE 6 is a fragmentary front elevational view showing the connection of the central beam with the front axle.

FIGURE 7 is a side elevational view of the driven rear wheel with the spring nut removed.

In the drawings similar numerals refer to similar parts throughout the several views.

Figure 1:
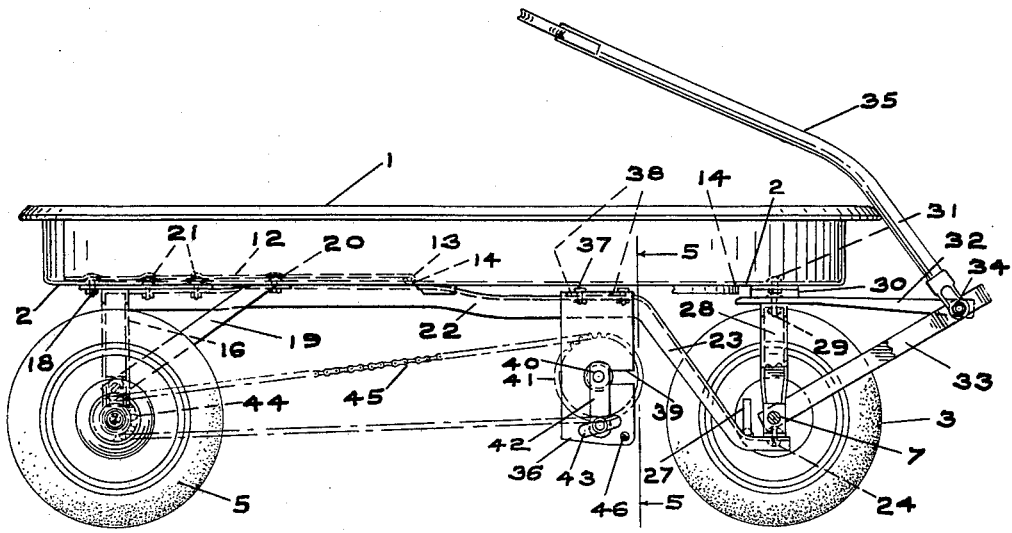
FIGURE 1 is a side elevational view of the wagon with the body floor door open.

The wagon has the usual sides 1 and floor or bottom 2 and forward wheels 3 and 4 and rear wheels 5 and 6. The forward wheels are supported on the axle 7 and the rear wheels on axle 8. One end of the rear axle is flattened as shown at 9 to fit a similarly configured opening 10 in the hub of the rear wheel 5 to drive the same. Spring nuts 11 are on the ends of both axles to hold the wheels thereon.

Figure 2:
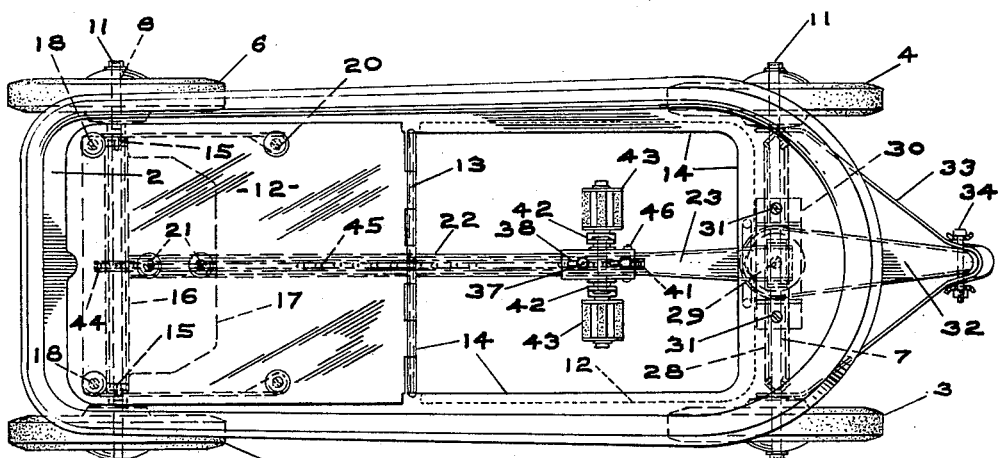
FIGURE 2 is a top plan view thereof.
Figure 4:
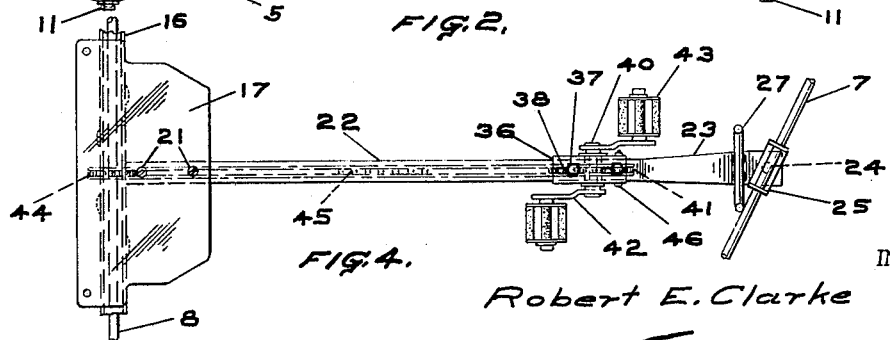
FIGURE 4 is a fragmentary top plan view of the center beam construction and its connected parts.

The floor 2 of the wagon has a hinged forward section 12, hinged transversely at 13 substantially in the center of the floor of the wagon. When this forward section is folded back as shown in FIGURES 1 and 2 an opening 14 is in the floor of the forward part of the wagon body. The rear axle 8 is supported in ball bearing brackets 15 bolted to the depending ends of inverted U-shaped frame 16 welded to plate 17 bolted as at 18 to the under side of the floor of the wagon. Angular braces 19 carried by the same bolts that hold the brackets 15 are bolted at their other ends to the body of the wagon as at 20. Bolted to plate 17, as at 21, is the central beam 22 which extends forward centrally under the body of the wagon and which supports the same as shown in FIGURES 1 and 2 and which is directed downwardly at its forward end 23, where it is bolted as at 24 to U-shaped bracket 25 which receives in transverse apertures 26, the front axle 7. A U-shaped member 27 is welded adjacent the forward end of the sloping part 23 of the beam 22 to limit the horizontal movement of axle 7 as shown in FIGURE 4.

Axle 7 is also supported by the inverted U-shaped frame 28 bolted as at 29 to the center plate 30 having an off-set center portion and which plate in turn is bolted as at 31 to the underside of the forward part of the floor of the body of the wagon. The top tongue member 32 extends between the center of plate 30 and the inverted U-shaped member 28 to form the fifth wheel of the wagon to support the horizontally turning front axle. Lower tongue members or fore hounds 33 are bolted as at 34 to the extending end of the upper tongue member 32 and their lower ends are apertured to receive the axle 7 therethrough, as shown in FIGURE 1. The tongue member 35 is connected to the same bolt 34 that holds the two tongue members 32 and 33 together.

Forward of the center of the beam 22 on inverted U-shaped bracket 36 is folded over the beam. The upper side of the bracket, as shown in FIGURES 4 and 5, is bolted to the beam by bolts 37 extending through elongated openings 38 in the bracket, which allow for the longitudinal adjustment of the bracket on the beam and bracket 36 has forwardly extended slots 39, through which is placed a shaft 40 carried by ball bearings whose housings are tightly fitted in the slots. The shaft 40 carries sprocket 41 and pedal brackets 42 welded to its outer ends. These pedal brackets 42 carry pedal arbors and pedals 43. The rear axle 8 has thereon sprocket 44, the two sprockets 44 and 41 carrying the chain 45. A spacer 46 connects the lower forward ends of the bracket 36. The openings 38 and bolts 37 allow for tightening the chain 45.

It will be apparent that the center beam forms a rigid support for the front axle and wheels of the wagon as well as for the pedals and the seat portion of the wagon and that it is in turn rigidly connected with the rear inverted U-shaped bracket which supports the rear axle and its sprocket and wheels. A minimum of parts rigidly connects the operating and weight carrying portions of the wagon.

It will also be apparent that various modifications may be made in the construction of the wagon of this invention without departing from the spirit of the invention as defined in the following claims.

What is claimed as new and is desired to be secured by Letters Patent is:

1. A toy wagon, the combination with a body having a door and a door opening in the floor thereof, axles and a pair of supporting wheels thereon at the front and rear of the body respectively, an inverted U frame rigidly connected to the body and supporting the axle for the rear wheels, one rear wheel being rigidly connected to its axle, a beam rigidly connected centrally to said inverted U frame and body, supporting the latter and extending forwardly and downwardly and being centrally and horizontally pivotally connected to the axle of the front wheels, a second inverted U frame centrally and horizontally pivoted to the body and supporting said last named axle adjacent its ends, stabilizing the same for horizontal turning between the body and beam connections thereto, a bracket depending from said beam and rigidly connected therewith within the body door opening, a sprocket with pedals thereon supported by said bracket, a sprocket on the rear wheel axle and a chain connecting said sprockets.

2. The wagon of claim 1 including means on the forward lower end of the beam to limit the horizontal turning of the axle for the front wheels.

3. The wagon of claim 2 including a tongue and a support therefor connected to the front inverted U-shaped frame to pull the wagon and steer it.

4. A toy wagon, the combination with a body having a transversely hinged door and a door opening in the forward portion of the floor thereof, axles and a pair of supporting wheels thereon at the front and rear of the body respectively, an inverted U frame rigidly connected to the body and supporting the axle for the rear wheels, one rear wheel being rigidly connected to its axle, a beam rigidly connected centrally to said inverted U frame and body, supporting the latter and extending forwardly and downwardly and being centrally and horizontally pivotally connected to the axle of the front wheels, a second inverted U frame centrally and horizontally pivoted to the body and supporting said last named axle adjacent its ends, stabilizing the same for horizontal turning between the body and beam connections thereto, an inverted U-shaped bracket straddling said beam and rigidly connected therewith within the body door opening, a sprocket with pedals thereon supported by said bracket, a sprocket on the rear wheel axle and a chain connecting said sprockets.

References Cited by the Examiner
UNITED STATES PATENTS

| | | | |
|---|---|---|---|
| 545,517 | 9/1895 | Miller | 280—7.17 |
| 1,549,295 | 8/1925 | Carlson | 280—7.17 |
| 2,444,386 | 6/1948 | Trabucco | 280—87.01 |
| 2,958,535 | 11/1960 | Dupree | 280—261 X |
| 3,081,105 | 12/1963 | Sendoynas | 280—7.17 |
| 3,116,073 | 12/1963 | Ott et al. | 280—282 XR |

BENJAMIN HERSH, *Primary Examiner.*